(12) United States Patent
Mohseni

(10) Patent No.: US 7,064,881 B2
(45) Date of Patent: Jun. 20, 2006

(54) INP-BASED PHASE MODULATORS AND METHODS FOR MAKING AND USING SAME

(75) Inventor: Hooman Mohseni, Princeton, NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 10/792,585

(22) Filed: Mar. 3, 2004

(65) Prior Publication Data
US 2004/0240024 A1    Dec. 2, 2004

Related U.S. Application Data
(60) Provisional application No. 60/474,540, filed on May 30, 2003.

(51) Int. Cl.
*G02F 1/03*    (2006.01)
(52) U.S. Cl. .......... 359/248; 359/245; 359/247; 359/238
(58) Field of Classification Search .......... 257/21; 381/1; 359/327; 372/55, 59, 54, 51, 75, 372/34
See application file for complete search history.

(56) References Cited

U.S. PATENT DOCUMENTS

| | | | | | |
|---|---|---|---|---|---|
| 4,672,405 | A | * | 6/1987 | Derkits, Jr. | 327/119 |
| 4,745,452 | A | * | 5/1988 | Sollner | 372/43 |
| 4,987,094 | A | * | 1/1991 | Colas et al. | 257/185 |
| 5,519,721 | A | * | 5/1996 | Takano | 372/46.012 |
| 5,825,525 | A | * | 10/1998 | Harwit | 359/248 |
| 5,955,742 | A | * | 9/1999 | Kikkawa | 257/14 |
| 5,965,899 | A | * | 10/1999 | Little, Jr. | 257/17 |
| 6,167,073 | A | * | 12/2000 | Botez et al. | 372/46 |
| 6,486,491 | B1 | * | 11/2002 | Najda | 257/18 |
| 2002/0097945 | A1 | * | 7/2002 | Chang et al. | 385/10 |
| 2004/0070810 | A1 | * | 4/2004 | Yu et al. | 359/248 |

* cited by examiner

*Primary Examiner*—Minsun Harvey
*Assistant Examiner*—Tuan N. Nguyen
(74) *Attorney, Agent, or Firm*—Lorenstein Sandler PC

(57) ABSTRACT

A modulator, including: an active modulator layer including a plurality of step quantum wells, wherein at least one of the plurality of step quantum wells is configured to have a leaky electron energy state; and at least one inactive layer bounding the active modulator layer.

18 Claims, 8 Drawing Sheets

NO LATERAL CONFINEMENT

WITH LATERAL CONFINEMENT

SQUARE QUANTUM WELL

STEP QUANTUM WELL $E=0$ $\qquad$ $E>0$

SQUARE QUANTUM WELL

STEP QUANTUM WELL $E=0$ $\qquad$ $E>0$

INP-BASED PHASE MODULATORS AND METHODS FOR MAKING AND USING SAME

CROSS REFERENCE TO RELATED APPLICATIONS

This Application claims the benefit of priority to copending U.S. Provisional Patent Application Ser. No. 60/474,540 entitled "Highly Sensitive InP-based phase modulators based on step quantum wells", filed May 30, 2003, the entire disclosure of which is hereby incorporated by reference as if being set forth herein in its entirety.

STATEMENT REGARDING FEDERALLY SPONSORED RESEARCH

This invention was made with U.S. government support under contract number DARPA # F30602-00-C-0116. The U.S. government has certain rights in this invention.

FIELD OF THE INVENTION

The present invention relates generally to a method and apparatus relating to quantum wells, and, more particularly, to a method and apparatus relating to inP-based modulators based on quantum wells.

DESCRIPTION OF THE BACKGROUND

Optical modulators, such as high-speed optical modulators, are useful in photonic systems. High speed optical modulators may operate pursuant to principals of electrorefraction (ER) or electroabsorption (EA). ER is often used for amplitude and phase modulation, while EA is used for amplitude modulation. An advantage provided by electrorefraction, as compared to electroabsorption, is the maintenance of low linear loss. Low optical absorption leads to low electron-hole pair generation and low heat generation. Accordingly, electrorefractive modulators can generally handle higher optical power densities than electroabsorptive modulators, due, in part, to the absence of bleaching and overheating. High optical power densities are desirable for radio-frequency (RF) photonic and long-haul optical fiber communication systems.

Additionally, low optical absorption allows for use of a Fabry-Perot or ring resonator to create "slow-wave" modulation. In slow wave modulation, modulation efficiency may be enhanced by orders of magnitude, due, in part, to enhanced interaction time. However, Fabry-Perot have conventionally failed to provide sufficient tunability for use in certain telecommunications applications.

Currently, commonly used materials for high-speed phase modulators include lithium niobate (LN), III–V compound semiconductors, and polymers. LN has been studied for commercial applications, such as acoustic-wave filters for mobile phones. Traveling-wave LN modulators have achieved bandwidths exceeding 100 GHz. However, LN modulators can generally not be integrated with III–V active components, due to material incompatibilities. Moreover, the low electrooptic coefficient of lithium niobate ($r_{33} \sim 30$ pm/V) may lead to a high operating voltage ($V_\pi L = 40$ to 80 Vmm), and hence long device size and high power consumption. Nonetheless, monolithic integration would be desirable in that it would allow for realization of low-cost photonic subsystems with high functionality and speed.

A main advantage of polymeric modulators is the relatively easy fabrication processes associated with it. Further, polymeric modulators may provide a high modulation bandwidth exceeding 110 GHz. However, polymeric modulators exhibit low electrooptic coefficients in the 10 to 70 pm/V range, which, in combination with a low refractive index, generates sensitivity similar to LN ($V_\pi L = 30$ to 200 Vmm). Other drawbacks of polymeric modulators include unproven lifetime and stability, and limited maximum optical power density and operating temperature.

Phase modulators based on III–V semiconductors are generally advantageous since, unlike LN or EA based modulators, they can provide both monolithic integration and high optical saturation power. However, although optical modulators based on III–V quantum wells have a higher sensitivity ($V_{\pi L} = 10$ to 20 Vmm) as compared to LN and polymeric modulators, III–V quantum well optical modulators are typically difficult to couple to fiber optics, and hence are not generally suitable for discrete devices. Nonetheless, III–V modulators serve well for monolithic integration with other III–V active components.

Power consumption is important in an integrated device, since power generation and transfer, as well as heat dissipation, are significantly restricted in a closely packed integrated subsystem. Therefore, there have been significant efforts to enhance material sensitivity in modulators, since modulator power consumption is inversely proportional to the square of the material sensitivity. Theoretically, more than one order of magnitude enhancement of sensitivity has been predicted for symmetric and asymmetric coupled quantum wells. More specifically, one order of magnitude reduction in $V_\pi$ has been predicted using asymmetric coupled quantum wells in III–V based phase modulators. Experimental results however, have shown enhancements approaching a factor of five in a GaAs/AlGaAs material system. Most desirably, high-speed and high-power integrated modulators with $V_\pi < 1$ volt may provide for advanced RF-photonic fiber optic links. Unfortunately, such improvements, in accordance with these experimental results, have not yet been demonstrated for indium phosphide (InP)-based modulators, which are attractive for telecommunication applications.

Therefore, the need exists for a method and apparatus for realizing a low voltage InP-based modulator that lowers operating voltages and power consumption of devices employing the modulator, as compared to devices employing conventional modulators.

BRIEF SUMMARY OF THE INVENTION

A modulator, comprising: an active modulator layer comprising a plurality of step quantum wells, wherein at least one of said plurality of step quantum wells is configured to have a leaky electron energy state; and, at least one inactive layer bounding said active modulator layer.

BRIEF DESCRIPTION OF THE SEVERAL VIEWS OF THE DRAWINGS

For the present invention to be clearly understood and readily practiced, the present invention will be described in conjunction with the following figures, wherein like reference numerals represent like elements, and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements found in a modulation apparatus, system, and method. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1A:
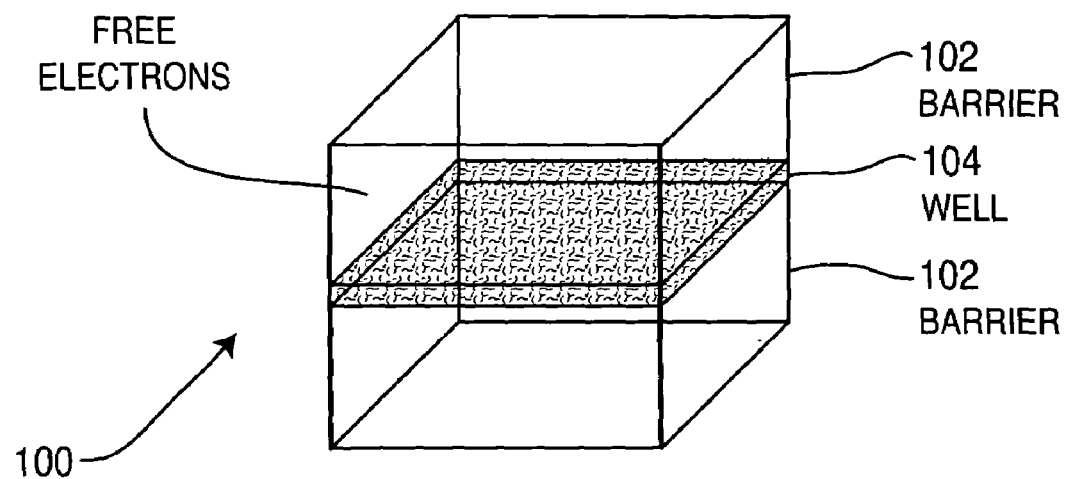
FIGS. 1A and 1B are schematic diagrams illustrating electron densities in a single quantum well structure without and with lateral confinement.
Figure 1B:
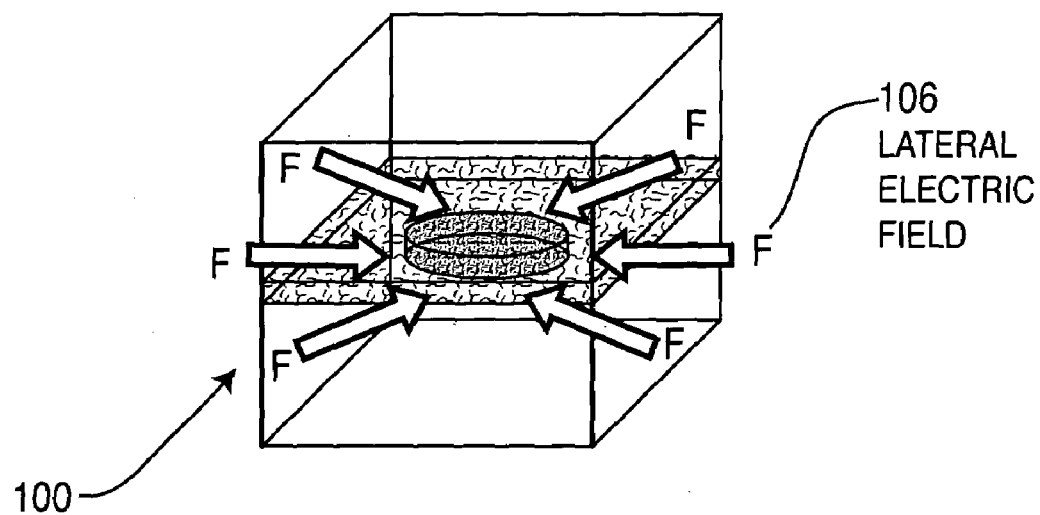

According to an aspect of the present invention, a method and apparatus of realizing a modulator may be employed using a conventional quantum well, or in a quantum well having induced thereon a lateral electric field on a conventional quantum well structure. The induction of a lateral electric field on a conventional quantum well structure may provide a three-dimensional quantum confinement, or "quantum dot". FIGS. 1A and 1B are schematic diagrams illustrating electron densities in a single quantum well structure without (1A) and with (1B) lateral confinement. A quantum well structure 100 in accordance with the present invention may include well barriers 102, at least one well 104, and may, in a lateral confinement embodiment, include one or more lateral electric fields 106.

The application of an external electric field to a quantum well may generate redshift of the absorption edge due to the quantum confined stark effect (QCSE), and reduction of peak excitonic absorption due to the electron and hole wavefunction shift in the opposite direction. However, these two effects may compete with each other, as the redshift of the absorption edge produces a positive change of index, while the reduction of peak excitonic absorption produces a negative change of index.

Consistently, an exemplary method of electrorefractive enhancement may include reducing one of these effects and/or enhancing the other. According to an aspect of the present invention, step quantum wells, rather than conventional square quantum wells, may be employed to obtain such electrorefractive enhancements. Step quantum wells, as compared to conventional square quantum wells, may also provide less challenging material growth due to the absence of a very thin barrier or sudden composition changes.

According to an aspect of the present invention, optical modulators may be based on intersubband (usually $\lambda > 3$ μm) and interband transition in step quantum wells, for example. Thus, the present invention may utilize step quantum wells to form energy states near the "leaky mode" for electrons, and energy states near a "bound mode" for holes, to produce an enhanced redshift, and to further prevent a sudden reduction of the absorption peak under the applied electric field.

Figure 2:
FIG. 2 is a graphical depiction illustrating an exemplary electron wavefunction of a step quantum well, as compared to a square quantum well.
Figure 2:
Figure 2:
Figure 2:

Referring now to FIG. 2, there is shown a graphical depiction illustrating an exemplary electron wavefunction of a step quantum well, as compared to a square quantum well, without and with an external field. At $E=0$ (left illustration), the electron wavefunction in the step quantum well is bounded on one side and leaky on the other side. This leads to a slight shift of the electron wavefunction toward the left-hand-side of the step quantum well as compared to the square quantum well.

For $E>0$ (right illustration), the energy state of the square quantum well goes partly below the bottom of the potential well. This leads to a super-exponential decay (Airy function) of the wavefunction. However, in a step quantum well the energy state may be maintained above the bottom of the well, and thereby result in a smaller wavefunction shift in accordance with an aspect of the present invention.

In an exemplary embodiment of the present invention, a GaInAsP material system may be used. As will be readily understood by those possessing an ordinary skill in the pertinent arts though, GaAs/AlGaAs, AlInAsSb/GaInAsSb, AlGaInAs/GaInAsP, or the like could also be used. Because the effective mass of a heavy hole in a GaInAsP material system is significantly higher than the effective mass of an electron, a step quantum well in accordance with the discussion hereinabove may be used to form a "bond mode" state for heavy holes.

Figure 3:
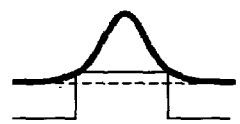
FIG. 3 is a graphical depiction illustrating a comparison of the hole wavefunctions for a square quantum well and a step quantum well.
Figure 3:
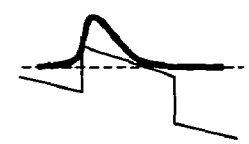
Figure 3:
Figure 3:

Referring now also to FIG. 3, there is shown a graphical depiction illustrating a comparison of the hole wavefunctions for a square quantum well and a step quantum well in accordance with the discussion hereinabove. As illustrated, under an external electric field, the hole wavefunction in the step quantum well neither deforms nor shifts as much as the hole wavefunction in the square quantum well. This is due, in part, to the fact that the wavefunction is confined in the "intra" well of the step quantum well, which is much narrower than the overall well.

Figure 4A:
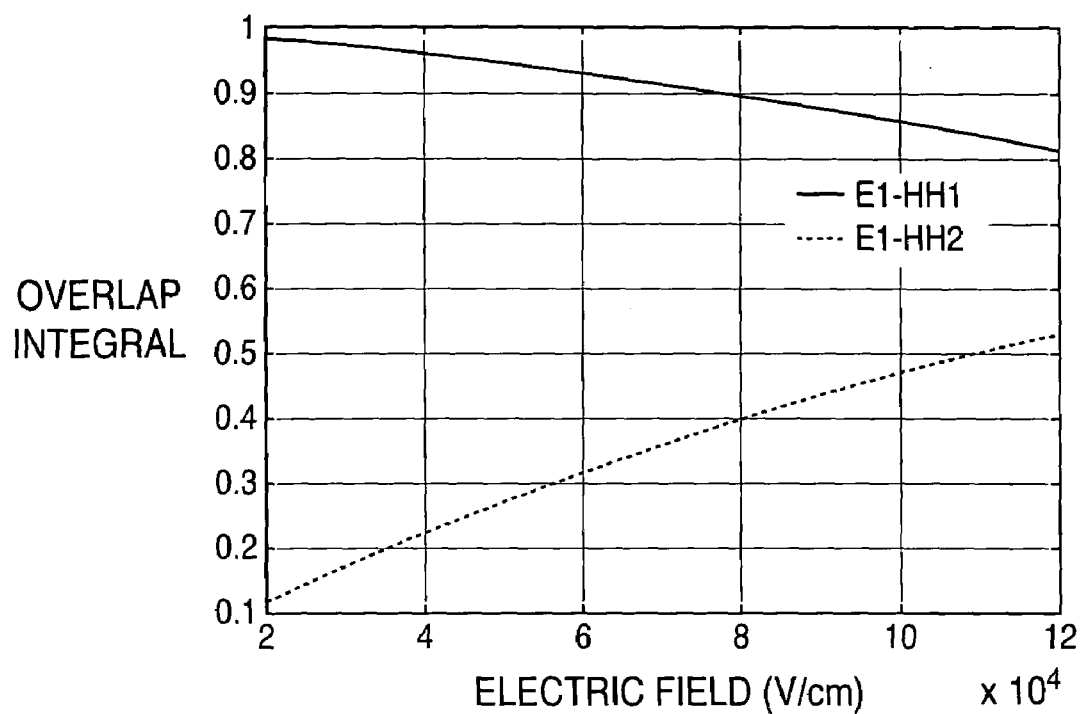
FIG. 4a is a graphical depiction illustrating a calculated overlap integral for the first electron state (E1), and the first and second heavy hole states (HH1 and HH2), versus an external field, in a square quantum well.

Referring now also to FIG. 4, there is shown a graphical depiction illustrating a calculated overlap integral for the first electron state (E1), and the first and second heavy hole states (HH1 and HH2), versus an external field, in a square quantum well. The illustrated overlap integral decreases from 0.98 at E=20 kV/cm (the internal field of a device with ~0.5 μm depleted layer at zero bias) to 0.9 at E=80 kV/cm ($V_{bias}$~3 volt), or by nearly 8%.

Figure 4B:
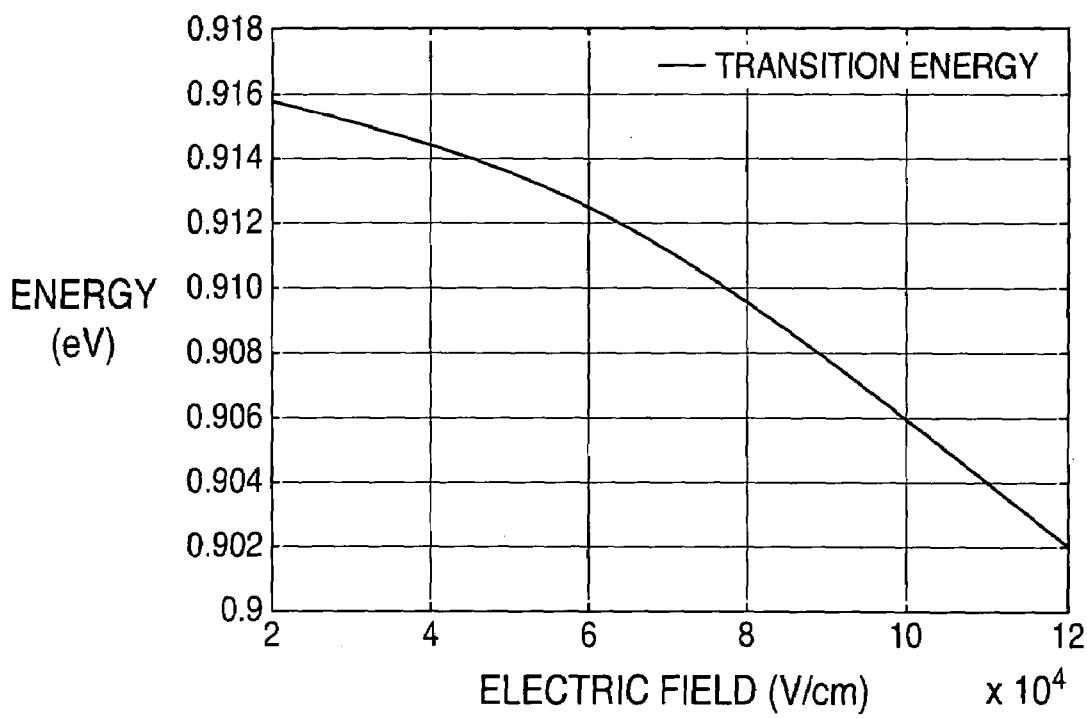
FIG. 4b is a graphical depiction illustrating the transition energy of the square quantum well versus electric field.
Figure 5A:
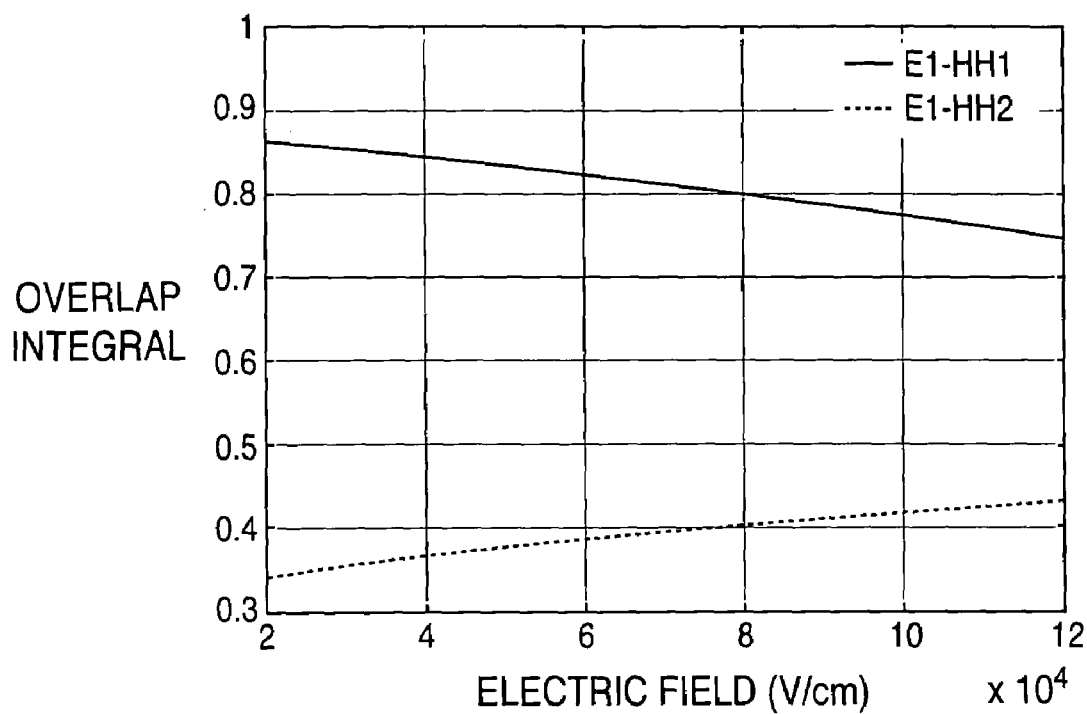
FIG. 5a is a graphical depiction of an instance similar to that of FIG. 4, but instead employing an optimized step quantum well.

Referring now also to FIG. 5, there is shown a graphical depiction of an instance similar to that of FIG. 4, but instead employing a step quantum well. The overlap integral, as illustrated, has decreased from 0.86 at E=20 kV/cm to 0.80 at E=80 kV/cm, or by nearly 7%. Thus, the overlap integral for the step quantum well decreases slightly slower than that of the square quantum well.

Figure 5B:
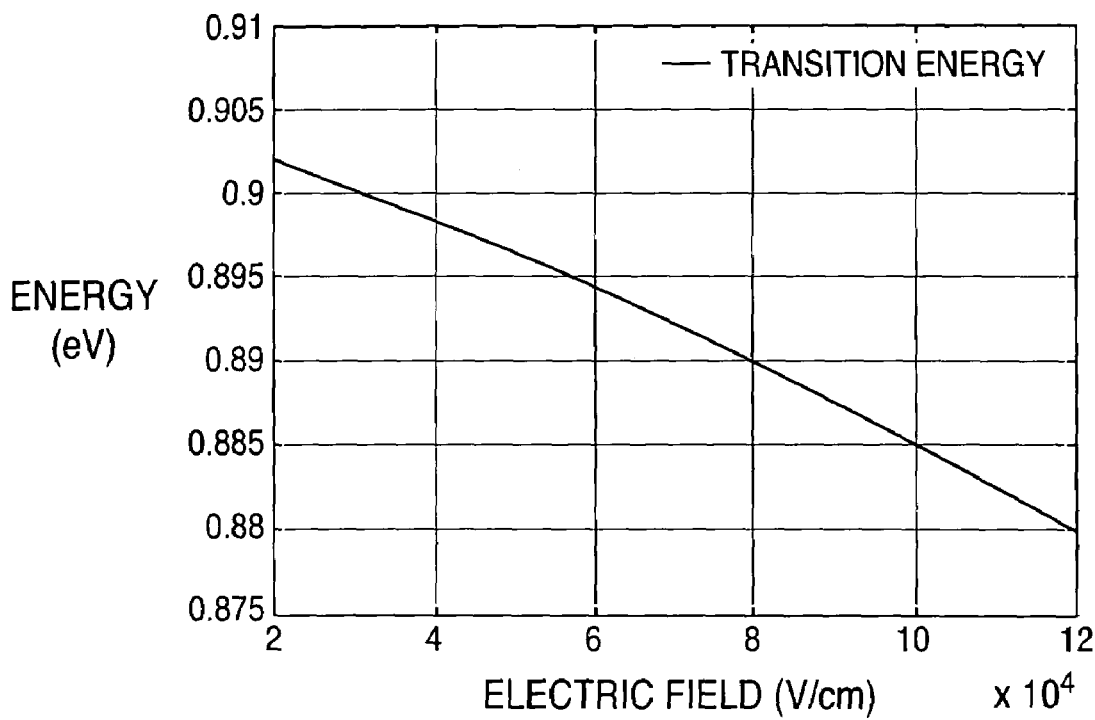
FIG. 5b illustrates a plot similar to FIG. 4b, but for the optimized step quantum well.

The wavelength redshift is significantly different for the two structures discussed hereinabove. FIG. 4b illustrates the transition energy or the "bandgap" of the square quantum well versus electric field. The redshift, as illustrated, is about 6 meV for a change of field from E=20 kV/cm to E=80 kV/cm. FIG. 5b illustrates a plot similar to FIG. 4b, but for the step quantum well, wherein the redshift is about 12 meV for a change of field from E=20 kV/cm to E=80 kV/cm.

In an exemplary embodiment of the present invention, multi-quantum well active layers with step quantum well structures, as well as square quantum well structures, may be grown, such as by metal organic vapor phase deposition (MOCVD), on InP substrates. In certain exemplary embodiments of the present invention, step wells having two and three steps may be used, although other numbers of steps may be used as will be apparent to those skilled in the art. The number of wells grown may be such that, for example, the overall thickness of the quantum well active layer is ~200 nm for the devices. Further, the top and bottom cladding layers of the quantum well structure built may be formed of p and n-type InP, respectively.

Figure 6:
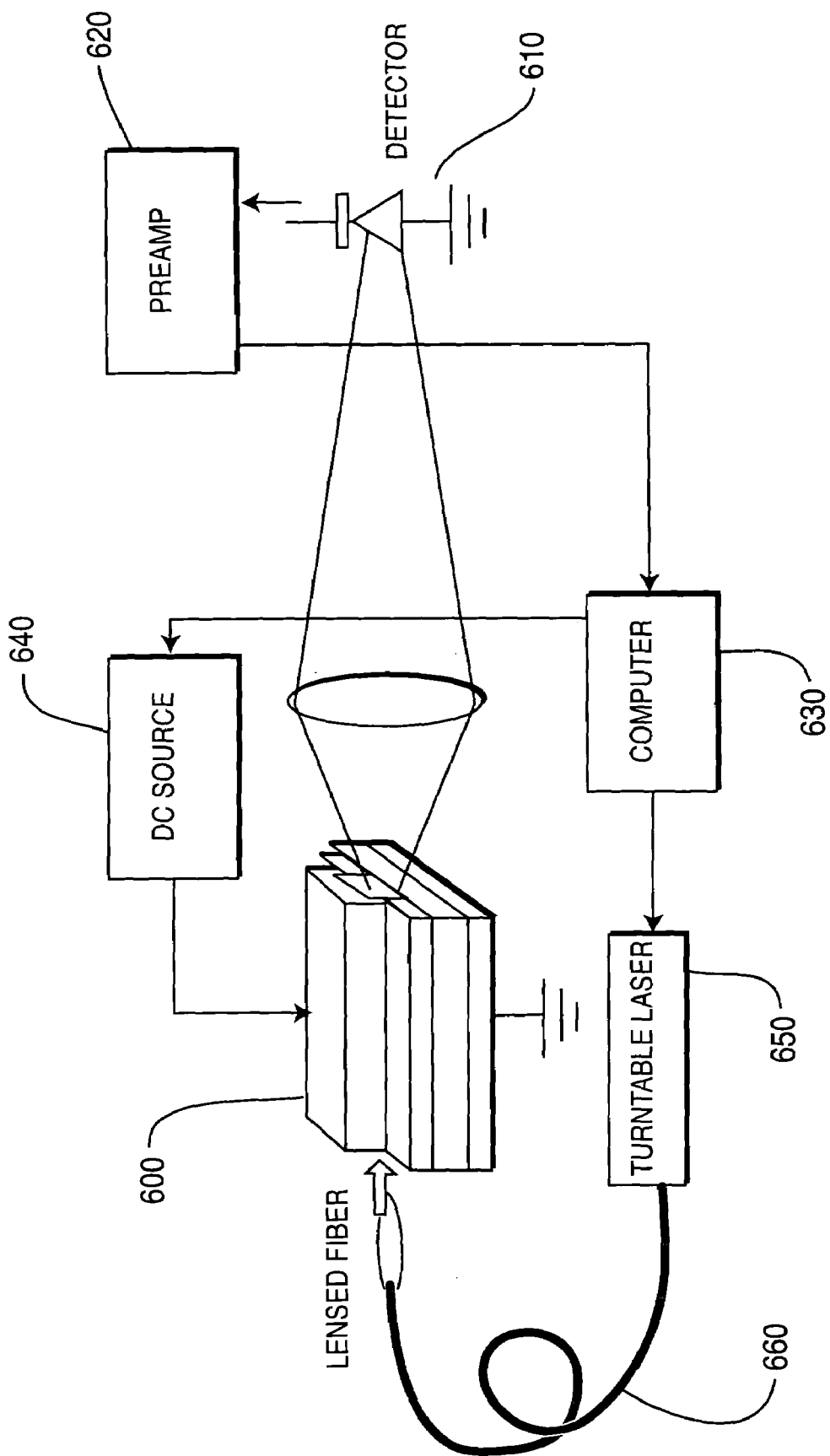
FIG. 6 is a block diagram illustrating a testing environment for measuring variables in the present invention.

In an exemplary embodiment of the method of building the structures discussed hereinabove, the building material may be processed into planar or ridge waveguides, and cleaved into, for example, 1 to 2 mm long sections with uncoated facets. The variable denoting the change of index of the material may then be measured, such as by using Fabry-Perot oscillation shifts, and the variable denoting the linear loss may be measured from the optical transmission and/or the device photocurrent. FIG. 6 is a block diagram illustrating an exemplary testing environment for measuring these variables in the present invention. The testing environment may include, for example, a detector 610 feeding a pre-amplifier 620, in-turn coupled to a computer 630. Computer 630 may control a DC source 640 for biasing device 600, and source 650 for lighting lensed fiber 660 to feed device 600. Source 650 may take the form of a tunable laser, for example.

Figure 7A:
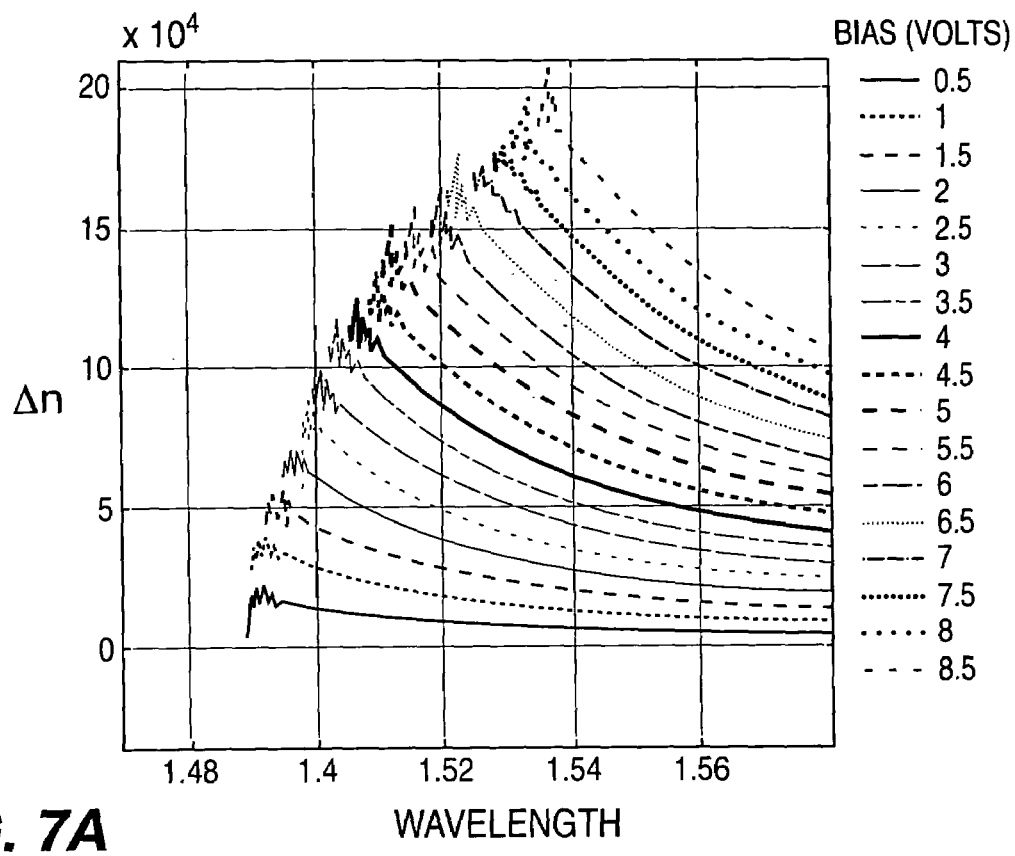
FIG. 7 is a graphical depiction illustrating exemplary data collected in the testing embodiment of FIG. 6 for structures built in accordance with the present invention.
Figure 7B:
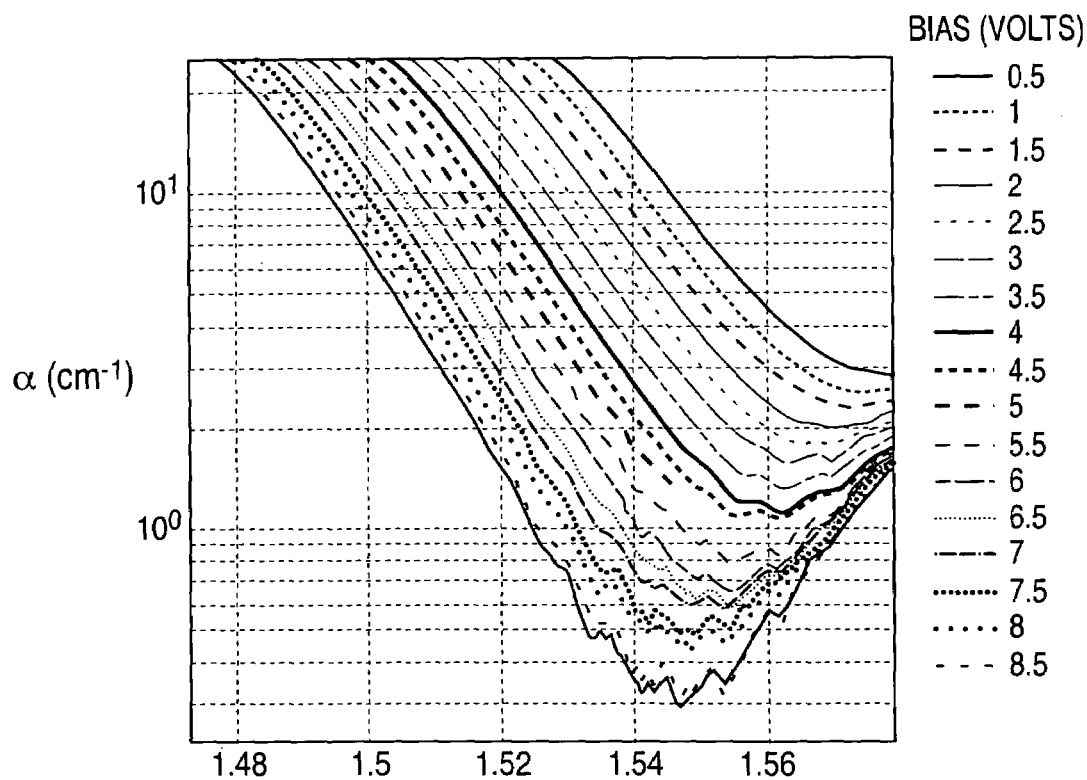

Referring now also to FIG. 7, there is shown a graphical depiction illustrating exemplary data collected using the testing embodiment of FIG. 6, for exemplary structures built in accordance with the present invention. In the illustrated exemplary embodiment, heating of the sample may be minimized by maintaining the power dissipation below a few, such as less than 20, milliwatts. As illustrated, optical absorption measured from the transmission and photocurrent may be markedly similar through the use of the present invention, thereby indicating that the loss in the tested samples is dominated by interband absorption of the quantum wells.

Figure 8A:
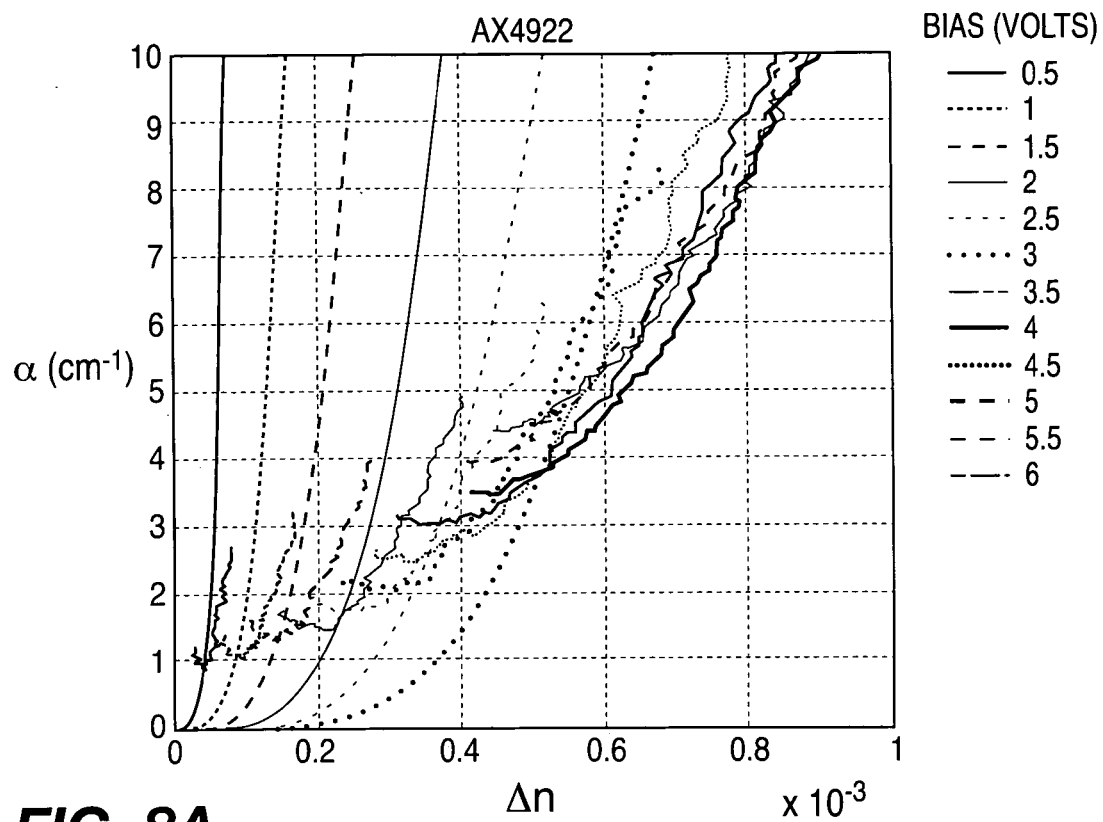
FIG. 8 is a graphical depiction illustrating measured and modeled change of index and loss, versus wavelength and bias, as a result of the method and apparatus of the present invention.
Figure 8B:
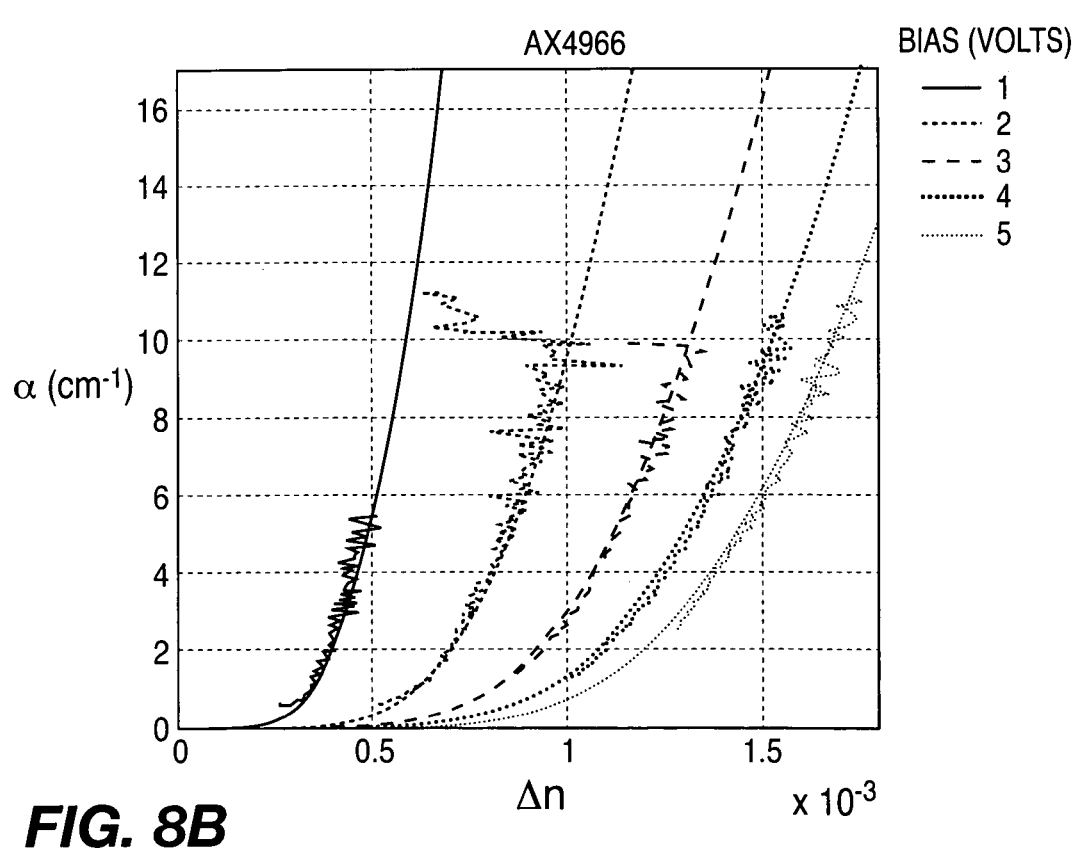

Referring now also to FIG. 8, there is shown a graphical depiction illustrating measured and modeled change of index and loss, versus wavelength and bias, as a result of the method and apparatus of the present invention. FIG. 8 plots the measured and modeled change of index and loss, versus wavelength and bias, for a square quantum well in FIG. 8a, and for an optimized step quantum well in FIG. 8b. FIG. 8 illustrates that, at a constant absorption coefficient of ~1 cm$^{-1}$, the change of index for a square quantum well is less than $1\times10^{-4}$/volt, and, at a similar condition, is ~$3\times10^{-4}$/volt for a step quantum well in accordance with the present invention. Thus, the $V_\pi L$ product may be ~8 Vmm for an exemplary square quantum well design, and ~2.6 Vmm for an optimized step quantum well design in accordance with the present invention. Historically, and as compared with the prior art, this $V_\pi L$ product, obtained in accordance with the present invention, is significantly improved for InP based phase modulators operating near 1550 nm with an absorption coefficient $\alpha$~1 cm$^{-1}$.

Thus, the active layer of one or more modulators in accordance with the present invention may be based on the stepped quantum wells discussed hereinabove. The absorption spectrum of these stepped quantum well modulators may be modeled using an effective mass approach, and the excitonic effect may be modeled using a variational method. The change of index, as discussed hereinabove, may be calculated using the Kramers-Kronig relationship, as will be understood by those skilled in the art. Thickness and composition of the quantum well layers for use in the modulator may be optimized, as discussed hereinabove, for maximum change of index, while the absorption coefficient may be maintained below ~1 cm$^{-1}$. A low absorption coefficient may enhance the sensitivity further by using resonant-enhanced modulators, for example.

As discussed hereinabove, and in a more specific exemplary embodiment with respect to the modulator structures of the present invention, modulator structures in the present invention may be based on an GaInAsP quaternary system, and may be grown by low-pressure metal organic vapor phase epitaxy (MOVPE) on n-type InP substrates. The thickness of the active layer in this exemplary design may be maintained at ~0.4 μm, such as by adjusting the number of quantum wells. Composition and thickness of other layers may, for example, be nominally the same for all structures. The modulator material may be processed into planar and index guided waveguides for measurements, also as discussed hereinabove.

Figure 9:
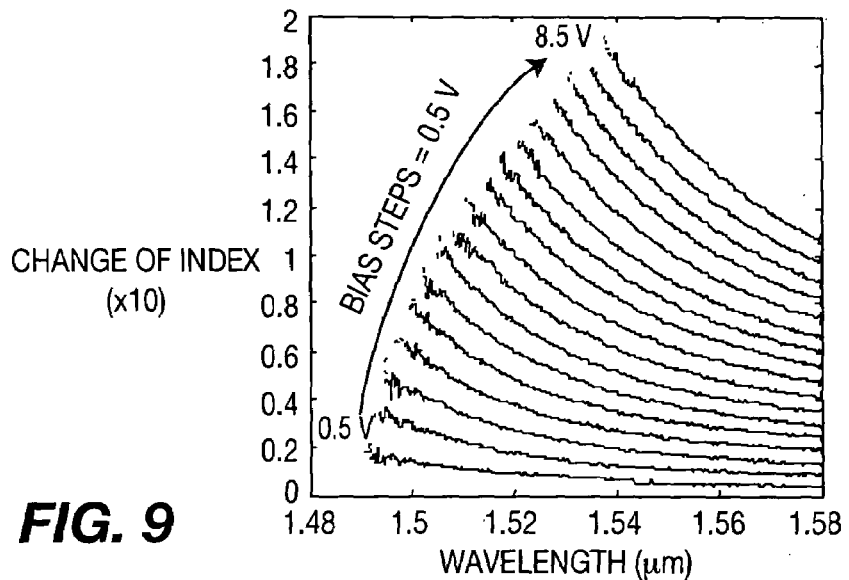
FIG. 9 is a graphical depiction illustrating an example of the measured change of index versus wavelength for different biases in a modulator with a two-step quantum well design.
Figure 10:
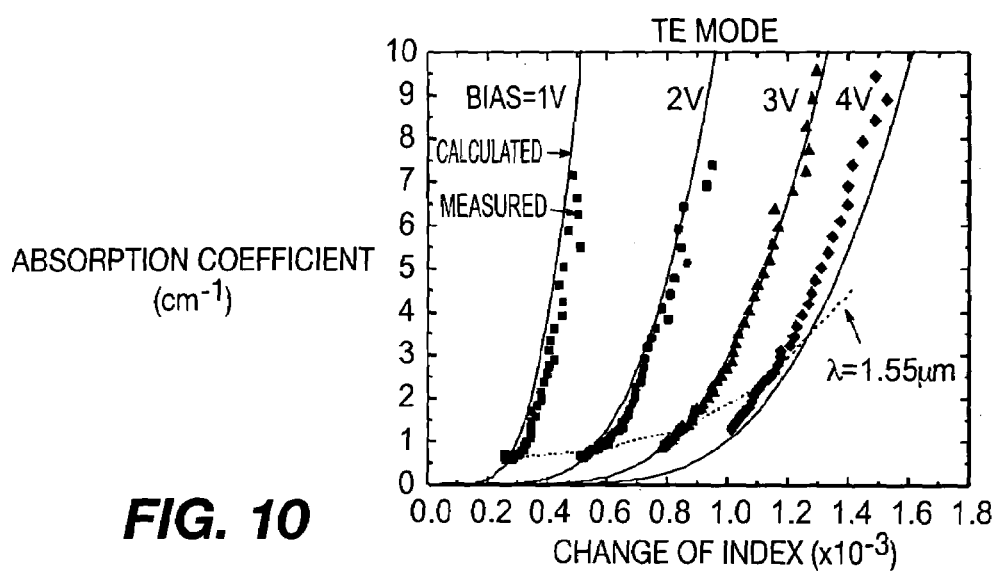
FIG. 10 is a graphical depiction illustrating the measured overall loss versus change of index for an exemplary modulator with an optimized three-step quantum well at different biases.

Optical absorption coefficient and change of index of a modulator may be measured using the optical transmission, photoresponse, and/or Fabry-Perot oscillation shifts of the modulator, for example. FIG. 9 is a graphical depiction illustrating an example of the measured change of index versus wavelength for different biases in a modulator with a two-step quantum well design. FIG. 10 is a graphical depiction illustrating the measured overall loss versus change of index for an exemplary modulator with an optimized three-step quantum well at different biases. Solid lines representing the calculated absorption versus change of index show good agreement with the experimental data in this exemplary embodiment.

Figure 11:
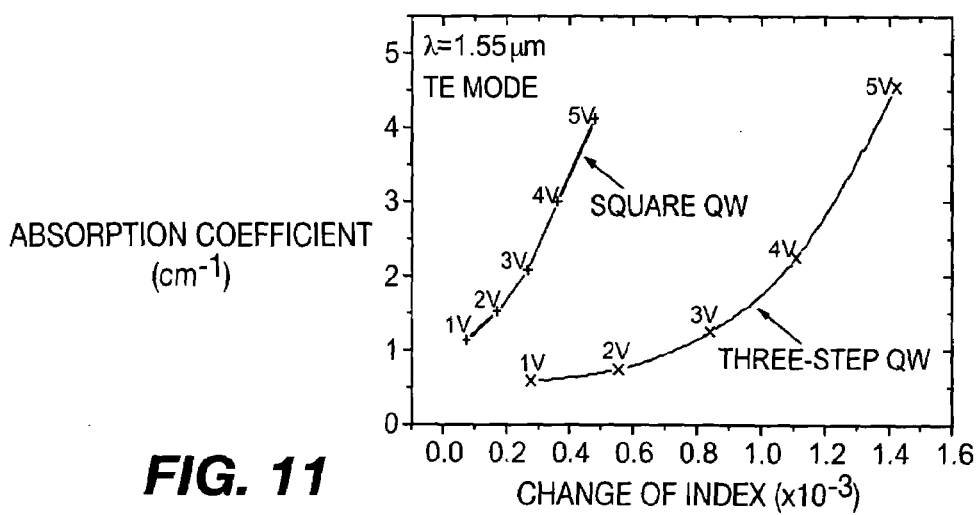
FIG. 11 is a graphical depiction illustrating a comparison of the optical loss versus change of index of a modulator with conventional square quantum wells, and an otherwise similar modulator with a three-step quantum well design at 1.55 μm.

FIG. 11 is a graphical depiction illustrating a comparison of the optical loss versus change of index of a modulator with conventional square quantum wells, and an otherwise similar modulator with a three-step quantum well design at 1.55 μm. As illustrated, the change of index of the square quantum wells for absorption coefficient below 1 cm$^{-1}$ is about ~$1\times10^{-4}$/V, which is similar to reported values, but that absorption coefficient is $2.9\times10^{-4}$/V for the three-step quantum well using the present invention. This leads to a reduction of $V_\pi L$ product from ~7.6 Vmm to 2.6 Vmm, as will be apparent to those skilled in the art. Since modulator power consumption is proportional to the square of the operating voltage, this results in nearly one order of magnitude lowering of power consumption per unit length for the step quantum well design of the present invention.

More specifically, high-speed optical modulators have many applications in photonic systems, such as fiber optics telecommunication and photonic-based radio-frequency (RF) transmitters. Power consumption is a major issue for high-speed optical modulators, since it is proportional to the square of the operating frequency. This problem becomes more significant for the next generation photonic systems, where higher speed, higher optical power, and chip-scale integration are required. Thus, the present invention provides a method and apparatus that enhances the electrorefractive sensitivity of waveguide and normal incident modulators, and modulators using three step stepped quantum wells, in accordance with the present invention, evidence nearly three times higher electrorefraction sensitivity, and thereby evidence nearly an order of magnitude improvement in power consumption over the prior art. Thereby, the present invention provides electrorefraction enhancement, with reduced power consumption, in the important 1.3 and 1.55 μm wavelength ranges.

Modulators according to the present invention may find applicability in a wide variety of opto-electronic devices. For example, they may be well suited for free-space applications. They may be well suited for use in optical switches, such as add/drop devices. They may be well suited for use in phase modulators, such as Mach-Zehnder devices. They may be well suited for single sideband applications. They may be well suited for DWDM applications.

Those of ordinary skill in the art will recognize that many modifications and variations of the present invention may be implemented. The foregoing description and the following claims are intended to cover all such modifications and variations falling within the scope of the following claims, and the equivalents thereof.

What is claimed is:

1. An electro-refractive modulator, comprising:
   a plurality of step quantum wells; and,
   p-doped and n-doped inactive layers bounding said quantum wells;
   wherein, said quantum wells each support an electron wavefunction that becomes larger in size under negative bias of said p-doped inactive layer and positive bias of said n-doped inactive layer.

2. The modulator of claim 1, wherein said modulator exhibits an enhanced redshift.

3. The modulator of claim 2, wherein the enhanced redshift is in a range of about 12 meV for a change of field applied from about 20 kV/cm to about 80 kV/cm.

4. The modulator of claim 1, wherein each of said plurality of quantum wells comprises GaInAsP.

5. The modulator of claim 1, wherein each of said plurality of quantum wells comprises material selected from the group consisting of GaAs/AlGaAs, AlInAsSb/GaInAsSb, and AlGaInAs/GaInAsP.

6. The modulator of claim 5, wherein said material is organic vapor phase deposited on an InP substrate.

7. The modulator of claim 1, wherein each of said plurality of quantum wells comprises three steps.

8. The modulator of claim 1, wherein said plurality of quantum wells comprises a sufficient number of step quantum wells to provide an active modulation layer having an overall thickness of about 200 nm.

9. The modulator of claim 1, wherein one of said inactive layers forms a top cladding layer and the other forms a bottom cladding layer.

10. The modulator of claim 9, wherein said top cladding layer comprises p-type InP.

11. The modulator of claim 9, wherein said bottom cladding layer comprises n-type InP.

12. The modulator of claim 1, wherein an active layer comprising said quantum wells supports an optical mode having a substantially constant absorption coefficient of about 1 cm$^1$.

13. The modulator of claim 12, wherein said modulator has a $V_\pi$ product of about 2.6 V-mm.

14. The modulator of claim 1, wherein said modulator has an operating wavelength range around 1550 nm.

15. The modulator of claim 1, wherein said modulator has an operating wavelength range around 1300 nm.

16. The modulator of claim 1, wherein the quantum wells are in an active layer having a thickness of about 0.4 μm.

17. An opto-electronic device comprising the modulator of claim 1.

18. A Mach-Zehnder interferometer comprising the modulator of claim 1.

* * * * *